United States Patent [19]

Matsunaga et al.

[11] Patent Number: 5,089,322
[45] Date of Patent: Feb. 18, 1992

[54] POLYETHYLENE RESIN COMPOSITION AND FILM THEREOF

[75] Inventors: Takasi Matsunaga; Tosihiro Nisimura, both of Ichihara, Japan

[73] Assignee: Mitsui Petrochemical Industries, Ltd., Tokyo, Japan

[21] Appl. No.: 399,071

[22] Filed: Aug. 24, 1989

[30] Foreign Application Priority Data

Sep. 1, 1988 [JP] Japan ................. 63-219431

[51] Int. Cl.$^5$ ............ C08L 23/06; C08L 23/18; C08L 23/08; C08J 5/18
[52] U.S. Cl. ................... 428/220; 525/240
[58] Field of Search .......... 428/220; 525/240

[56] References Cited

U.S. PATENT DOCUMENTS

| | | | |
|---|---|---|---|
| 4,346,834 | 8/1982 | Mazumdar | 525/240 |
| 4,530,732 | 7/1985 | Horn | 156/244.18 |
| 4,770,912 | 9/1988 | Farrer et al. | 428/35 |
| 4,786,688 | 11/1988 | Thiersault et al. | 525/240 |
| 4,954,391 | 9/1990 | Kotani et al. | 428/220 |

FOREIGN PATENT DOCUMENTS

0103942  3/1984  European Pat. Off.
2097324  11/1982  United Kingdom .

*Primary Examiner*—Carman J. Seccuro
*Attorney, Agent, or Firm*—Sherman and Shalloway

[57] ABSTRACT

A polyethylene resin composition comprised of
(A) 30 to 50% by weight of a linear low density polyethylene resin wherein
 (i) the $MFR_{190°C}$ is 0.3 to 3.0/10 min,
 (ii) the density is 0.900 to 0.918 g/cc,
 (iii) the $MI_{20}/MI_2$ is 40 or less,
 (iv) there are one or more endothermic peaks of the melting point determined by a differential scanning calorimeter, wherein, when there are two or more peaks, the highest melting point ($T_{m1}$) is 118° to 125° C. and the ratio $T_{m1}H/T_{m2}H$ between the endothermic peak height ($T_{m1}H$) of the highest melting point and the next low temperature side endothermic peak height ($T_{m2}H$) of 1.2 or less, and
 (v) the comonomer is an α-olefin having four or more carbon atoms;
(B) 20 to 40% by weight of a high density polyethylene resin wherein
 (i) the $MFR_{190°C}$ is 0.01 to 0.2 g/10 min,
 (ii) the density is 0.935 to 0.950 g/cc, and
 (iii) the $MI_{20}/MI_2$ is 80 or more,
(C) 10 to 40% by weight of a high pressure low density polyethylene resin wherein
 (i) the $MFR_{190°C}$ is 0.1 to 2.0 g/10 min,
 (ii) the density is 0.915 to 0.924 g/cc, and
 (iii) the melt tension is 5 g or more,
wherein the polyethylene resin composition is characterized in that
 (i) the $MFR_{190°C}$ is 0.2 to 1.0 g/10 min,
 (ii) the density is 0.918 to 0.935 g/cc, and
 (iii) the melt tension is 5 g or more.

13 Claims, No Drawings

POLYETHYLENE RESIN COMPOSITION AND FILM THEREOF

BACKGROUND OF THE INVENTION

1. Field of the Invention

The present invention relates to a poly-ethylene resin composition having an excellent balance of strength, rigidity, and gloss and excellent in moldability (or shapability), heat sealability of through contaminant and low temperature resistance properties. More particularly it relates to a polyethylene resin composition and film thereof, suitable for use as heavy duty packaging bags such as for organic fertilizer.

2. Description of the Related Art

At the present time, industrial heavy duty bags comprised of polyolefin resin film are being used for many packaging bags such as for organic fertilizer since they have superior moisture-resistance and can be easily sealed air-tightly by heat sealing the openings. Such polyolefin resin film heavy duty packaging bags are produced by shaping high pressure low density polyethylene resin manufactured by the high pressure method, or high pressure low density polyethylene resin copolymerized with about 3 to 6 mole% of vinyl acetate, to a thickness of about 200 μm. These high pressure low density polyethylene films are inferior in strength, rigidity, and gloss compared with linear low density polyethylene resin film manufactured by the medium and low pressure methods.

On the other hand, in recent years, to conserve on resources, various types of packaging materials have been made thinner. Due to the above-mentioned characteristics, the use of linear low density polyethylene resin with large strength and rigidity is being increased. However, linear low density polyethylene resin places a large load on the motor of the extruder due to its moldability, in particular in inflation molding, and the bubble stability is poorer than the case of high pressure low density polyethylene resin. In the manufacture of a thick film, due in part to the insufficient cooling of the bubbles, the bubbles become unstable and formation of film becomes difficult. Further, the film surface easily becomes rough. Therefore, film-forming machines using linear low density polyethylene resin as materials are given larger lip clearance of the dies and make use of screws with small compression ratios, motors with large capacities, and devices for strengthening the cooling. It is difficult to form a film by a machine for high pressure low density polyethylene with a small lip clearance and small motor capacity.

Therefore, in consideration of the moldability, the method has been used of mixing high pressure low density polyethylene resin into the linear low density polyethylene resin material, but in this case, the rigidity and strength decline. Further, to alleviate the above-mentioned problems in the use of linear low density polyethylene resin as the sole material, it is necessary to broaden the distribution of molecular weight and increase the molecular weight. A film obtained in this way can satisfy requirements of rigidity, but is inferior in strength and gloss.

SUMMARY OF THE INVENTION

Accordingly, the objects of the present invention are to eliminate the above-mentioned disadvantages of the prior art and to provide a polyethylene resin composition capable of easily forming a thin film with an excellent balance of strength, rigidity, and gloss and excellent in heat sealability of through contaminant and low temperature resistance properties by a molding machine with a small lip clearance and small motor capacity and of a film provided with the above-mentioned superior properties.

Other objects and advantages of the present invention will be apparent from the following description.

In accordance with the present invention, there is provided a polyethylene resin composition comprising:

(A) 30 to 50% by weight of a linear low density polyethylene resin having (i) an $MFR_{190°C}$ of 0.3 to 3.0 g/10 min, (ii) a density of 0.900 to 0.918 g/cc, (iii) an $/MI_{20}/MI_2$ of 40 or less, and (iv) one or more endothermic peaks of the melting point determined by a differential scanning calorimeter, wherein, when there are two or more peaks, the highest melting point ($T_{ml}$) is 118° to 125° C. and the ratio $T_{m1}H/T_{m2}H$ between the endothermic peak height ($T_{m1}H$) of the highest melting point and the next low temperature side endothermic peak height ($T_{m2}H$) is 1.2 or less, and containing (v) an α-olefin having 4 or more carbon atoms as a comonomer;

(B) 20 to 40% by weight of a high density polyethylene resin having (i) an $MFR_{190°C}$ of 0.01 to 0.2 g/10 min, (ii) a density of 0.935 to 0.950 g/cc, and (iii) an $MI_{20}/MI_2$ of 80 or more; and (C) 10 to 40% by weight of a high pressure low density polyethylene resin having (i) an $MFR_{190°C}$ of 0.1 to 2.0 g/10 min, (ii) a density of 0.915 to 0.924 g/cc, and (iii) a melt tension of 5 g or more, wherein the polyethylene resin composition has (i) an $MFR_{190°C}$ of 0.2 to 1.0 g/10 min, (ii) a density of 0.918 to 0.935 g/cc, and (iii) a melt tension of 5 g or more.

In accordance with the present invention, there is also provided a polyethylene resin film of a thickness of 50 to 250 μm obtained by molding by the air cooling inflation method a polyethylene resin composition comprised of (A) 30 to 50% by weight of a linear low density polyethylene resin wherein having (i) an $MFR_{190°C}$ of 0.3 to 3.0 g/10 min, (ii) a density of 0.900 to 0.918 g/cc, (iii) an $MI_{20}/MI_2$ of 40 or less, and (iv) one or more endothermic peaks of the melting point determined by a differential scanning calorimeter, wherein, when there are two or more peaks, the highest melting point ($T_{m1}$) is 118° to 125° C. and the ratio $T_{m1}H/T_{m2}H$ between the endothermic peak height ($T_{m1}H$) of the highest melting point and the next low temperature side endothermic peak height ($T_{m2}H$) is 1.2 or less, and containing (v) an α-olefin having 4 or more carbon atoms as a comonomer;

(B) 20 to 40% by weight of a high density polyethylene resin having (i) $MFR_{190°C}$ of 0.01 to 0.2 g/10 min, (ii) a density of 0.935 to 0.950 g/cc, and, (iii) an $MI_{20}/MI_2$ of 80 or more; and (C) 10 to 40% by weight of a high pressure low density polyethylene resin having (i) an $MFR_{190°C}$ of 0.1 to 2.0 g/10 min, (ii) a density of 0.915 to 0.924 g/cc, and (iii) a melt tension of 5 g or more, said polyethylene resin composition having (i) an $MFR_{190°C}$ of 0.2 to 1.0 g/10 min, (ii) a density of 0.918 to 0.935 g/cc, and (iii) a melt tension of 5 g or more, wherein the film is characterized by (i) a gloss of 50% or more, (ii) a Young's modulus of 500 kg/cm$^2$ or more, and (iii) a dart impact strength of 40 kg/cm or more.

DESCRIPTION OF THE PREFERRED EMBODIMENTS

The linear low density polyethylene resin (A) usable in the present invention is a copolymer of ethylene and a comonomer comprised of α-olefins having 4 or more carbon atoms. This linear low density polyethylene resin is synthesized at 0 to 100 atmospheres (gage pressure) using a coordination catalyst i.e., is manufactured by the so-called medium and low pressure method.

The comonomers may include α-olefins having 4 or more carbon atoms, preferably 4 to 20 carbon atoms such as 1-butene, 4-methyl-1-pentene, 1-hexene, and 1-octene. The content of the comonomer in the copolymer is 0.5 to 40 mole%, preferably 0.5 to 30 mole%.

Such a linear low density polyethylene resin (A) has an MFR$_{190°C}$ (melt flow rate: ASTM D 1238, (E)) of 0.3 to 3.0 g/10 min, preferably 0.5 to 2.5 g/10 min. When the MFR$_{190°C}$ is smaller than 0.3 g/10 min, surface roughness and inferior extrusion occur, while when larger than 3.0 g/10 min, the bubble becomes unstable, so these are not preferable. Further, the density is 0.900 to 0.918 g/cc, preferably 0.900 to 0.915 g/cc. When the density is smaller than 0.900 g/cc, the rigidity becomes insufficient, while when greater than 0.918, the strength becomes insufficient, so these are not preferable. The MI$_{20}$/MI$_2$ is 40 or less, preferably 15 to 35. Here, the MI$_{20}$ is the value of the MFR$_{190°C}$ at a load of 21.6 kg and MI$_2$ is the value of the MFR$_{190°C}$ at a load of 2.16 kg. MI$_2$ is the ratio of the same. Further, there are one or more endothermic peaks of the melting point determined by a differential scanning calorimeter (DSC). When there are two or more peaks, the highest melting point (T$_{m1}$) is 118° to 125° C., preferably 118° to 123° C., and the ratio T$_{m1}$H/T$_{m2}$ between the endothermic peak height (T$_{m1}$H) of the highest melting point and the next low temperature side endothermic peak height (T$_{m2}$H) is 1.2 or less, preferably 1.0 or less. At this time, the measurement by the differential scanning calorimeter adopts the method of giving identical histories to the samples at all times by raising the measurement samples once to 200° C., then lowering them to 47° C. and then measuring the endothermic peaks. The amount of mixture of the linear low density polyethylene resin is 30 to 50% by weight, preferably 35 to 50% by weight.

The high density polyethylene resin (B) is comprised of ethylene homopolymer or an ethylene and α-olefin copolymer. This high density polyethylene resin is synthesized by the low pressure method using a Ziegler-Natta catalyst, the Phillips method and other medium pressure methods, and the like.

The α-olefins may include those with 3 to 20 carbon atoms, for example, propylene and 1-butene. The content of α-olefins is 0 to 10 mole%, preferably 0.2 to 7 mole%. This high density polyethylene resin (B) has an MFR$_{190°C}$ of 0.01 to 0.2 g/10 min, preferably 0.03 to 0.1 g/10 min. When the MFR$_{190°C}$ is less than 0.01 g/10 min, extrusion defects occur, while when it is larger than 0.2 g/10 min, the strength becomes insufficient, so these are not preferable. The density is 0.935 to 0.950 g/cc, preferably 0.935 to 0.945 g/cc. When the density is less than 0.935 g/cc, the rigidity becomes insufficient, while when it is greater than 0.950 g/cc, the strength becomes insufficient, so these are not preferable. The MI$_{20}$/MI$_2$ is 80 or more, preferably 90 or more. When less than 80, the bubbles become unstable, so this is not preferable.

The amount of mixture of the high density polyethylene resin is 20 to 40% by weight, preferably 20 to 35% by weight.

The high pressure low density polyethylene resin (C) is a homopolymer of ethylene or a copolymer with vinyl acetate. This high pressure low density polyethylene resin is synthesized by the high pressure method where synthesis is performed at 1000 to 2000 atmospheres and 200° to 300° C. by radical polymerization.

The amount of the vinyl acetate is 2 to 10 mole%, preferably 2 to 8 mole%. This high pressure low density polyethylene resin (C) has an MFR$_{190°C}$ of 0.1 to 2.0 g/10 min, preferably 0.1 to 1.00/10 min. When the MFR$_{190°C}$ is less than 0.1 g/10 min, extrusion defects occur, while when larger than 2.0 g/10 min, the bubbles become unstable, so these are not preferable. The density is 0.915 to 0.924 g/cc, preferably 0.918 to 0.924 g/cc. When the density is smaller than 0.915 g/cc, the rigidity becomes insufficient, while when larger than 0.924 g/cc, the strength becomes insufficient, so these are not preferable. The melt tension is 5 g or more, preferably 7 g or more.

The amount of the high pressure low density polyethylene resin mixed in is 10 to 40% by weight, preferably 20 to 35% by weight.

The resin composition comprised of the above-mentioned components (A) to (C) may be mixed by, for example, dry blending using a Henschel mixer and/or melt blending using an extruder.

The polyethylene resin composition according to the present invention has an MFR$_{190°C}$ of 0.2 to 1.0 g/10min, preferably 0.3 to 0.8 g/10 min., a density of 0.918 to 0.935 g/cc, preferably 0.920 to 0.930 g/cc, and a melt tension of 5 g or more, preferably 6 g or more.

The polyethylene resin composition obtained in this way may be shaped or molded into a film by the air-cooling inflation method. The physical properties of the film obtained at this time are a gloss of 50% or more, preferably 60% or more, Young's modulus of 3500 kg/cm$^2$ or more, preferably 3800 kg/cm$^2$ or more, and a dart impact strength of 40 kg/cm or more, preferably 45 kg/cm or more. A film with a thickness of 50 to 250 μm with an excellent balance of strength, rigidity, and gloss and superior in heat sealability of through contaminant and low temperature resistance properties can be obtained.

As mentioned above, the polyethylene resin composition of the present invention is comprised of the components (A) to (C), so enables a film which used to be used in thicknesses of 90 μm or more to be made thinner and enables shaping or molding of a film having an excellent balance of strength, rigidity, and gloss and superior in heat sealability of through contaminant and low temperature resistance properties by a molding machine with a small lip clearance and a small motor capacity.

EXAMPLES

The present invention will now be further illustrated by, but is by no means limited to, the following Examples.

The measurements in the Examples were performed by the following methods:

(1) MFR$_{190°C}$ Measured according to ASTM D 1238 (D) at 190° C.

(2) Density: Measured according to ASTM D 1505.

(3) $MI_{20}/MI_2$: $MI_{20}$ is value of MFR determined by ASTM D 1238 at 190° C. with load of 21.6 kg, while $MI_2$ is similarly value of MFR at load of 2.16 kg. The ratio of the same was calculated.

(4) Melting point ($T_m$): Measured by differential scanning calorimeter (made by Perkin Elmer Co.) Samples of 4 to 5 mg were weighed and raised in temperature to 200° C. at a rate of temperature rise of 10° C./min, held there for 10 minutes, then lowered to 47° C. at a rate of temperature descent of 20° C./min. After this, they were raised at a rate of temperature rise of 10° C./min and the endothermic peaks were recorded on a chart. When there was one endothermic peak at this time, this was expressed as $T_m$. When there were two or more peaks, the endothermic peak of the highest melting point was expressed as $T_{m1}H$ and the next lower temperature side endothermic peak was expressed as $T_{m2}H$.

(5) Melt tension: Measured by melt tension tester made by Toyo Seiki Co.
Nozzle used: L=8.000 mm, D=2.095 mm
Test temperature: 190° C.
Extrusion speed: 15 mm/min
Takeup speed: 2 m/min (6) Gloss: Measured according to ASTM D 523 with angle of incidence of 60 degrees.

(7) Dart impact strength: Value measured according to ASTM D 1709 B divided by thickness.
Dart measurement value (kg)/Film thickness (cm)

(8) Young's modulus: Measured by tensile tester of fixed crosshead travel speed type (made by Instron Co.)
Sample: JIS K 6781 (dumb-bell)
Ambient temperature: 23° C.
Tensile speed: 500 mm/min
Chart speed: 200 mm/min
Measurement was made under the above conditions in the MD and T directions and the modulus was calculated by the following formula from the resultant chart. The values found were averaged out to give the Young's modulus (E).

$$E_0 = R_0(L_0/A)$$

wherein, $E_0$ is Young's modulus in various directions $R_0$ is the initial gradient, $L_0$ is the distance between chucks, and A is the minimum area during preparation of a sample.

At this time $R_0$ is calculated by the formula:

$$R_0 = F_1/L_1$$

wherein, $F_1$ is the load at any point on the initial tangent, and $L_1$ is the elongation corresponding to $F_1$ on the tangent.

(9) Sealing strength: The samples were sealed by a New Long HS-33D top sealer, then tested by a tensile tester of the fixed crosshead travel speed type and the strength at break measured.

(10) Low temperature bag dropping strength: Ten bags were prepared to be filled with 20 kg of material sealed at the top and bottom using a New Long HS-33D top sealer under conditions of a heater gap of 150 percent and a cooler gap of 200 percent. Each of the bags was dropped 10 times from its side surface in a $-10°$ C. environment from a height of 1.2 m and the number of ruptured bags was determined.

EXAMPLES 1 to 5

The linear low density polyethylene resin (LLDPE), high density polyethylene resin (HDPE), and high pressure low density polyethylene resin (HPLDPE) shown in Table 1 were mixed by a Henschel mixer and then pelletized by an extruder. The characteristics of the resultant compositions are shown in Table 1.

Using the resultant compositions, further, film was formed under the following molding conditions by the air-cooling inflation method to produce film having a thickness of 150 μm and a width of 450 mm. The physical properties of the same were measured by the above-mentioned measurement methods. The results are shown in Table 1.

Shaping machine: Placo LM65φ inflation shaping machine (made by Placo Co., HPLD specifications)
Screw: L/D=28, C.R=2.8, with intermediate mixing
Dies: 200 mmφ (diameter), 1.2 mm (lip clearance)
Air ring: 2 gap type
Shaping temperature: 210° C.
Takeup speed: 10 m/min

COMPARATIVE EXAMPLE 1

As the polyethylene resin, ethylenevinyl acetate (EVA) with an $MFR_{190° C.}$ of 0.6 g/10 min prepared by copolymerizing 4 percent by weight of vinyl acetate (VA) with HPLDPE was used. This was molded and measured in the same way as in Examples 1 to 5, except that the molding temperature was made 180° C. The result are shown in Table 1.

COMPARATIVE EXAMPLES 2 TO 6

As the polyethylene resin, those of the compositions shown in Table 1 were used. These were molded and measured in the same way as Examples 1 to 5, except that the molding temperature of Comparative Example 6 was made 180° C. The results are shown in Table 1.

TABLE 1

|  |  | Examples | | | | |
|---|---|---|---|---|---|---|
|  |  | 1 | 2 | 3 | 4 | 5 |
| LLDPE | $MER_{190°C.}$ (g/10 min) | 2.1 | 1.3 | 2.1 | 1.1 | 2.0 |
|  | Density (g/cc) | 0.911 | 0.909 | 0.905 | 0.907 | 0.902 |
|  | $MI_{20}/MI_2$ | 19 | 20 | 18 | 19 | 18 |
|  | DSC $T_{m1}H$ (°C.) | 122 | 121 | 120 | 120 | 120 |
|  | $T_{m1}H/T_{m2}H$ | 0.3 | 0.4 | 0.3 | 0.5 | 0.2 |
|  | Comonomer 1) | 4MP-1 | 4MP-1 | 4MP-1 | 4MP-1 | $C_4$ |
| HDPE | $MFR_{190°C.}$ (g/10 min) | 0.07 | 0.05 | 0.08 | 0.18 | 0.07 |
|  | Density (g/cc) | 0.940 | 0.940 | 0.945 | 0.940 | 0.940 |
|  | $MI_{20}/MI_2$ | 180 | 175 | 165 | 98 | 180 |
| HPLDPE | $MFR_{190°C.}$ (g/10 min) | 0.6 | 0.6 | 0.6 | 0.3 | 0.6 |

TABLE 1-continued

|  |  |  |  |  |  |  |
|---|---|---|---|---|---|---|
|  | Density (g/cc) | 0.921 | 0.921 | 0.921 | 0.918 | 0.921 |
|  | DSC $T_m$ (°C.) | 109 | 109 | 109 | 108 | 109 |
|  | Melt tension (g) | 12 | 12 | 12 | 16 | 12 |
| LLDPE/HDPE/HPLDPE |  | 40/30/30 | 50/30/20 | 40/30/30 | 40/30/30 | 50/30/20 |
| EVA (%) |  | — | — | — | — | — |
| Composition | $MER_{190°C}$ (g/10 min) | 0.4 | 0.5 | 0.4 | 0.7 | 0.6 |
|  | Density (g/cc) | 0.925 | 0.929 | 0.926 | 0.923 | 0.923 |
|  | Melt tension (g) | 8.5 | 8.1 | 8.7 | 6.8 | 8.3 |
| Moldability | Extrudability | ○ | ○ | ○ | ○ | ○ |
|  | Bubble stability | ○ | ○ | ○ | ○ | ○ |
| Film physical properties | Gloss (%) | 70 | 73 | 70 | 75 | 72 |
|  | Dart impact strength (kg/cm) | 53 | 55 | 54 | 52 | 51 |
|  | Young's modulus × $10^3$ (kg/cm$^2$) | 4.3 | 4.6 | 4.3 | 4.0 | 4.1 |
|  | Sealing strength (g/15 mm) | 5200 | 5300 | 5200 | 4900 | 4700 |
| Bag performance | Low temperature bag dropping strength −10° C. (No.) | 0 | 0 | 0 | 0 | 0 |

|  |  | Comparative Examples | | | | | |
|---|---|---|---|---|---|---|---|
|  |  | 1 | 2 | 3 | 4 | 5 | 6 |
| LLDPE | $MER_{190°C}$ (g/10 min) |  | 2.0 |  | 2.0 | 1.6 |  |
|  | Density (g/cc) |  | 0.918 | 0.918 | 0.920 | 0.909 |  |
|  | MI$_{20}$/MI$_2$ |  | 18 | 18 | 18 | 19 |  |
|  | DSC $T_{m1}$H (°C.) |  | 124 | 124 | 124 | 122 |  |
|  | $T_{m1}$H/$T_{m2}$H |  | 1.2 | 1.2 | 1.2 | 0.3 |  |
|  | Comonomer 1) |  | 4MP-1 | 4MP-1 | 4MP-1 | 4MP-1 |  |
| HDPE | $MFR_{190°C}$ (g/10 min) |  |  |  |  | 0.07 |  |
|  | Density (g/cc) |  |  |  |  | 0.940 |  |
|  | MI$_{20}$/MI$_2$ |  |  |  |  | 180 |  |
| HPLDPE | $MFR_{190°C}$ (g/10 min) |  | 1.0 | 1.0 |  |  | 0.4 |
|  | Density (g/cc) |  | 0.921 | 0.921 |  |  | 0.919 |
|  | DSC $T_m$ (°C.) |  | 109 | 109 |  |  | — |
|  | Melt tension (g) |  | 10 | 10 |  |  | — |
| LLDPE/HDPE/HPLDPE |  |  | 60/0/40 | 80/0/20 | 100/0/0 | //0 | 0/0/100 |
| EVA (%) |  | 100 | — | — | — | — | — |
| Composition | $MER_{190°C}$ (g/10 min) | 0.6 | — | — | — | — | — |
|  | Density (g/cc) | — | — | — | — | — | — |
|  | Melt tension (g) | — | — | — | — | — | — |
| Moldability | Extrudability | ○ | ○ | Δ | x | ○–Δ | ○ |
|  | Bubble stability | ○ | ○–Δ | Δ | x | ○ | ○ |
| Film physical properties | Gloss (%) | 48 | 71 | 75 | Could not be formed | 35 | 68 |
|  | Dart impact strength (kg/cm) | 57 | 45 | 52 |  | 61 | 41 |
|  | Young's modulus × $10^3$ (kg/cm$^2$) | 2.2 | 3.4 | 3.8 |  | 4.3 | 3.0 |
|  | Sealing strength (g/15 mm) | 3900 | 4100 | 4200 |  | 4500 | 3500 |
| Bag performance | Low temperature bag dropping strength −10° C. (No.) | 3 | 2 | 4 |  | 3 | 6 |

1) Comonomer
4MP-1; 4-methyl-1-pentene
C$_4$; 1-Butene

From the results of Table 1, the polyethylene resin composition according to the present invention is superior in sealing strength and bag performance compared with the Comparative Examples and further is superior in the Young's modulus and gloss compared with EVA (Comparative Example 1) comprised of VA copolymerized with HPLDPE and is superior in the dart impact strength and Young's modulus compared with a resin comprised of HPLDPE (Comparative Example 6). Further, it is superior in moldability compared with a resin composition comprised of HPLDPE and LLDPE (Comparative Examples 2 and 3) and a resin comprised of LLDPE (Comparative Example 4) and is superior in gloss compared with a resin composition comprised of LLDPE and HDPE (Comparative Example 5). In this way, in the Examples, it was learned that it is possible to obtain a polyethylene resin film with a thickness of 150 μm with an excellent balance of strength, rigidity, and gloss and superior in moldability, heat sealability of through contaminant, and low temperature resistance properties.

We claim:
1. A polyethylene resin composition comprising:
 (A) 30 to 50% by weight of a linear low density polyethylene resin having (i) an $MFR_{190°C}$ of 0.3 to 3.0 g/10 min, (ii) a density of 0.900 to 0.915 g/cc, (iii) an MI$_{20}$/MI$_2$ of 40 or less, and (iv) one or more endothermic peaks of the melting point determined by a differential scanning calorimeter, wherein, when there are two or more peaks, the highest melting point ($T_{m1}$) is 118° to 125° C. and the ratio $T_{m1}$H/$T_{m2}$H between the endothermic peak height ($T_{m1}$H) of the highest melting point and the next low temperature side endothermic peak height ($T_{m2}H$) is 1.2 or less, and containing (v) an α-olefin having 4 or more carbon atoms as a comonomer;
(B) 20 to 40% by weight of a high density polyethylene resin having (i) an $MFR_{190°C}$ of 0.01 to 0.2 g/10 min, (ii) a density of 0.935 to 0.950 g/cc, and (iii) an $MI_{20}/MI_2$ of 80 or more; and
(C) 10 to 40% by weight of a high pressure low density polyethylene resin having (i) an $MFR_{190°C}$ of 0.1 to 2.0 g/10 min, (ii) a density of 0.915 to 0.924 g/cc, and (iii) a melt tension of 5 g or more,
said polyethylene resin composition having (i) an $MFR_{190°C}$ of 0.2 to 1.0 g/10 min, (ii) a density of 0.918 to 0.935 g/cc, and (iii) a melt tension of 5 g or more.

2. A polyethylene resin composition as claimed in claim 1, wherein the composition comprises 35% to 50% by weight of the linear low density polyethylene resin (A), to 35% by weight of the high density polyethylene resin (B), and 20% to 35% by weight of the high pressure low density polyethylene resin (C).

3. A polyethylene resin composition as claimed in claim 1, wherein the content of the comonomer in the linear low density polyethylene resin (A) is 0.5 to 40 mole%.

4. A polyethylene resin composition as claimed in claim 1, wherein the linear low density polyethylene resin (A) has (i) an $MFR_{190°C}$ of 0.5 to 2.5 g/10 min., (ii) a density of 0.900 to 0 915 g/cc, (iii) an $MI_{20}/MI_2$ of 15 to 35, and (iv) a highest melting point ($T_{m1}$) of 118° to 123° C. and the ratio $T_{m1}H/T_{m2}H$ of 1.0 or less.

5. A polyethylene resin composition as claimed in claim 1, wherein the high density polyethylene resin (B) is at least one member selected from the group consisting of ethylene homopolymers and copolymers of ethylene with up to 10 mole% of α-olefins having 3 to 20 carbon atoms.

6. A polyethylene resin composition as claimed in claim 1, wherein the high density polyethylene resin (B) has (i) an $MFR_{190°C}$ of 0.03 to 0.1 g/10 min, (ii) a density of 0.935 to 0.945 g/cc, and an $MI_{20}/MI_2$ of 90 or more.

7. A polyethylene resin composition as claimed in claim 1, wherein the high pressure low density polyethylene resin (C) is at least one member selected from the group consisting of ethylene homopolymers and copolymers of ethylene with 2 to 10 mole% of vinyl acetate.

8. A polyethylene resin composition as claimed in claim 1, wherein the high pressure low density polyethylene resin (C) has (i) an $MFR_{190°C}$ of 0.1 to 1.0 g/10 min., (ii) a density of 0.918 to 0.924 g/cc, and (iii) a melt tension of 7 g or more.

9. A polyethylene resin composition as claimed in claim 1, having (i) an $MFR_{190°C}$ of 0.3 to 0.8 g/10 min., (ii) a density of 0.920 to 0.930 g/cc, and (iii) a melt tension of 6 g or more.

10. A polyethylene resin film of a thickness of 50 to 250 μm obtained by molding by the air cooling inflation method a polyethylene resin composition comprised of
(A) 30 to 50% by weight of a linear low density polyethylene resin having (i) an $MFR_{190°C}$ of 0.3 to 3.0 g/10 min, (ii) a density of 0.900 to 0.915 g/cc, (iii) an $MI_{20}/MI_2$ of 40 or less, and (iv) one or more endothermic peaks of the melting point determined by a differential scanning calorimeter, wherein, when there are two or more peaks, the highest melting point ($T_{m1}$) is 118° to 125° C. and the ratio $T_{m1}H/T_{m2}H$ between the endothermic peak height ($T_{m1}H$) of the highest melting point and the next low temperature side endothermic peak height ($T_{m2}H$) of 1.2 or less, and containing (v) an α-olefin having four or more carbon atoms as a comonomer;
(B) 20 to 40% by weight of a high density polyethylene resin having (i) an $MFR_{190°C}$ of 0.01 to 0.2 g/10 min, (ii) a density of 0.935 to 0.950 g/cc, and (iii) an $MI_{20}/MI_2$ of 80 or more; and 0.950 g/cc, and (iii) an
(C) 10 to 40% by weight of a high pressure low density polyethylene resin having (i) an $MFR_{190°C}$ of 0.1 to 2.0 g/10 min, (ii) a density of 0.915 to 0.924 g/cc, and (iii) a melt tension of 5 g or more, said polyethylene resin composition having (i) an $MFR_{190°C}$ of 0.2 to 1.0 g/10 min, (ii) a density of 0.918 to 0.935 g/cc, and (iii) a melt tension of 5 g or more,
said film being characterized by (i) a gloss of 50% or more, (ii) a Young's modulus of 3500 kg/cm$^2$ or more, and (iii) a dart impact strength of 40 kg/cm or more.

11. A polyethylene resin composition according to claim 1 which comprises:
(A) 35-50% by weight of a linear low density polyethylene resin having (i) an $MFR_{190°C}$ of 0.5 to 2.5 g/10 min, (ii) a density of 0.900 to 0.915 g/cc, (iii) an $MI_{20}/MI_2$ of 15 to 35, and (iv) a highest melting point ($T_{m1}$) of 118°-123° C. and the ratio $T_{m1}H/T_{m2}H$ of 1.0 or less, and containing (v) from 0.5 to 40 mole % of the alpha-olefin comonomer;
(B) 20-35% by weight of a high density polyethylene resin selected from the group consisting of ethylene homopolymers, compolymers of ethylene with up to 10 mol% of alpha-olefins having 3 to 20 carbon atoms, and mixtures thereof said high density polyethylene resin (B) having (i) an $MFR_{190°C}$ of 0.03 to 0.1 g/10 min., (ii) a density of 0.935 to 0.945 g/cc, and an $MI_{20}/MI_2$ of 90 or more;
(C) 20-35% by weight of the high pressure low density polyethylene resin which is selected from the group consisting of ethylene homopolymers and copolymers of ethylene with 2-19 mol% of vinyl acetate, said high pressure low density polyethylene (C) having (i) an $MFR_{190°C}$ of 0.1 to 1.0 g/10 min., (ii) a density of 0.918 to 0.924 g/cc, and (iii) a melt tension of 7 g or more,
said polyethylene resin composition having (i) an $MFR_{190°C}$ of 0.3 to 0.8 g/10 min., (ii) a density of 0.920 to 0.930 g/cc, and (iii) a melt tension of 6 g or more.

12. The polyethylene resin composition of claim 11 which has a weight ratio of linear low density polyethylene resin (A): high density polyethylene resin (B): high pressure low density polyethylene resin (C) of about 40:30:30.

13. The polyethylene resin composition of claim 11 which has a weight ratio of linear low density polyethylene resin (A): high density polyethylene resin (B): high pressure low density polyethylene resin (C) of about 50:30:20.

* * * * *